US007676790B1

(12) United States Patent
Hsu et al.

(10) Patent No.: US 7,676,790 B1
(45) Date of Patent: Mar. 9, 2010

(54) PLASMA PROCESSING SYSTEM COMPONENT ANALYSIS SOFTWARE AND METHODS AND SYSTEMS FOR CREATING THE SAME

(75) Inventors: Gean Hsu, Fremont, CA (US); Theresa Moriguchi, Newark, CA (US)

(73) Assignee: Lam Research Corporation, Fremont, CA (US)

( * ) Notice: Subject to any disclaimer, the term of this patent is extended or adjusted under 35 U.S.C. 154(b) by 37 days.

(21) Appl. No.: 11/622,404

(22) Filed: Jan. 11, 2007

Related U.S. Application Data

(60) Provisional application No. 60/821,546, filed on Aug. 4, 2006.

(51) Int. Cl.
*G06F 9/44* (2006.01)
(52) U.S. Cl. .................. 717/106; 717/107; 717/113; 717/116
(58) Field of Classification Search ......... 717/104–113, 717/100, 174, 117, 143, 116, 123, 115, 121, 717/128, 170
See application file for complete search history.

(56) References Cited

U.S. PATENT DOCUMENTS

| | | | |
|---|---|---|---|
| 5,862,372 A | 1/1999 | Morris et al. | |
| 6,925,631 B2 * | 8/2005 | Golden | 717/115 |
| 7,127,702 B2 * | 10/2006 | Seki | 717/107 |
| 7,185,316 B1 * | 2/2007 | Morris et al. | 717/116 |
| 7,257,818 B2 * | 8/2007 | Foerg et al. | 719/310 |
| 7,370,315 B1 * | 5/2008 | Lovell et al. | 717/100 |
| 2004/0183831 A1 * | 9/2004 | Ritchy et al. | 345/762 |
| 2006/0075382 A1 * | 4/2006 | Shaburov | 717/106 |

OTHER PUBLICATIONS

A graphical programming environment for simulation of control and signal processing systems, Waknis, P.; Karsai, G.; Sztipanovits, J., Apr. 12-15, 1992, IEEE, pp. 447-450.*
Automatic generation of visual programming environments, Costagliola, G.; Tortora, G.; Orefice, S.; de Lucia, A., Mar. 1995, IEEE, pp. 56-66.*
The Software Architect's Assistant-a visual environment for distributed programming, Keng Ng; Kramer, J.; Magee, J.; Dulay, N., vol. 2 Jan. 3-6, 1995, IEEE, pp. 254-263.*
Next generation graphical development environment for test, O'Toole, K.; Salopek, P., 1998 IEEE, pp. 145-148.*

(Continued)

*Primary Examiner*—Wei Y Zhen
*Assistant Examiner*—Satish Rampuria
(74) *Attorney, Agent, or Firm*—IP Strategy Group, P.C.

(57) ABSTRACT

A method for generating plasma processing system component analysis software is provided. The method includes defining component specifications for a plurality of components. Each of the plurality of components implements at least one of a user-interface function, a logic operation function, an input function, and an output function for analyzing a plasma processing system component. Defining includes selecting the plurality of components from a component panel of a visual integrated design editor architecture (VIDEA), thereby causing the plurality of components to be disposed in a layout format in the VIDEA. Defining also includes specifying properties of each of the plurality of components by performing at least one of selecting from predefined properties and defining parameters for the properties. The method also includes saving the plurality of components after the defining in a mark-up language configured to be executable by a browser without requiring prior compiling.

9 Claims, 8 Drawing Sheets

OTHER PUBLICATIONS

"International Search Report", Issued in PCT Application No. PCT/US07/74849; Mailing Date: Jul. 29, 2008.

"Written Opinion", Issued in PCT Application No. PCT/US07/74849; Mailing Date: Jul. 29, 2008.

"Extended Search Report", Issued in European Application No. 07799939.9: Mailing Date: Aug. 5, 2009.

""USIXML: A Language Supporting Multi-path Development of User Interfaces"", Quentin Limbourg et al; Engineering Human Computer Interaction and Interactive Systems: [Lecture Notes in Computer Science:;LNCS], Springer-Verlag, Berlin/Heidelberg, vol. 3425, Jun. 30, 2005, pp. 200-220, XP019009959 ISBN: 978-3-540-26097-4 (Jun. 30, 2005).

"International Report on Patentability", Issued in PCT Application No. PCT/US2007/074849; Mailing Date: Feb. 19, 2009.

* cited by examiner

PLASMA PROCESSING SYSTEM COMPONENT ANALYSIS SOFTWARE AND METHODS AND SYSTEMS FOR CREATING THE SAME

PRIORITY CLAIM

This application is related to and claims priority under 35 U.S.C. §119(e) to a commonly assigned provisional patent application entitled "Visual Integrated Design Editor Architecture," by Hsu et al., Application Ser. No. 60/821,546 filed on Aug. 4, 2006, all of which are incorporated herein by reference.

BACKGROUND OF THE INVENTION

Advances in plasma processing have provided for growth in the semiconductor industry. As plasma processing continues to evolve, the needs for customized software applications to collect and analyze the data collected by the plasma processing system have also increased. As discussed herein, customized software application refers to software application that may be created to meet specific needs of an individual, a group, a department, a company, etc.

Customized software applications may be create for various reasons. For example, a customized software application may be created to simplify the task of collecting and/or retrieving information from a plasma processing system. Customized software application may also be created to provide procedural guidelines, such as ATAC test plans. In another example, customized software application may also be created to automate repetitive tasks.

Regardless of the reason for needing customized software applications, the task of creating customized software applications may be a complicated and complex task that generally requires programming skills and knowledge that a non-programmer may not possess. In addition, the task of maintaining and updating the customized software application may also require programming skills and knowledge. Consequently, the task of creating, maintaining, and updating customized software application in a plasma processing environment may become an expensive and a time-consuming task.

A method for creating customized software application may include having a software programmer employs a text editor to write software code. Once the software code has been crafted, the software code may be complied before an executable file may be generated. This method may be a time-consuming process that may require a software programmer to write code for both the design of the application and the function of the application. In an example, a simple form to collect data about a student may require a software programmer to write the code to design the physical format of the form and then write code to control the functionality and behavior of the form.

Another method for generating customized software application in a plasma processing environment may be based on an integrated development environment (IDE). IDE or also known as design editor refers to software that may be employed to develop other software applications. IDE may include, but are not limited to, components for creating a graphical user interface (GUI), text code editor for creating and editing code, tools to aid in the construction of a graphical user interface (GUI), a debugger, and a complier. Examples of IDE include, but are not limited to Microsoft® Visual Studio, Borland® Delphi, and National Instrument™ LabVIEW. With IDE, the task of creating the program code for a software application may be simplified. In an example, instead of writing the code for the GUI and the functionality of a software application, an IDE may have components that a programmer may employ to simplify the task of creating the GUI. However, even with the IDE, the creator of the software application still has to have the skill and knowledge to write the code that defines the functionality of GUI.

Figure 1:
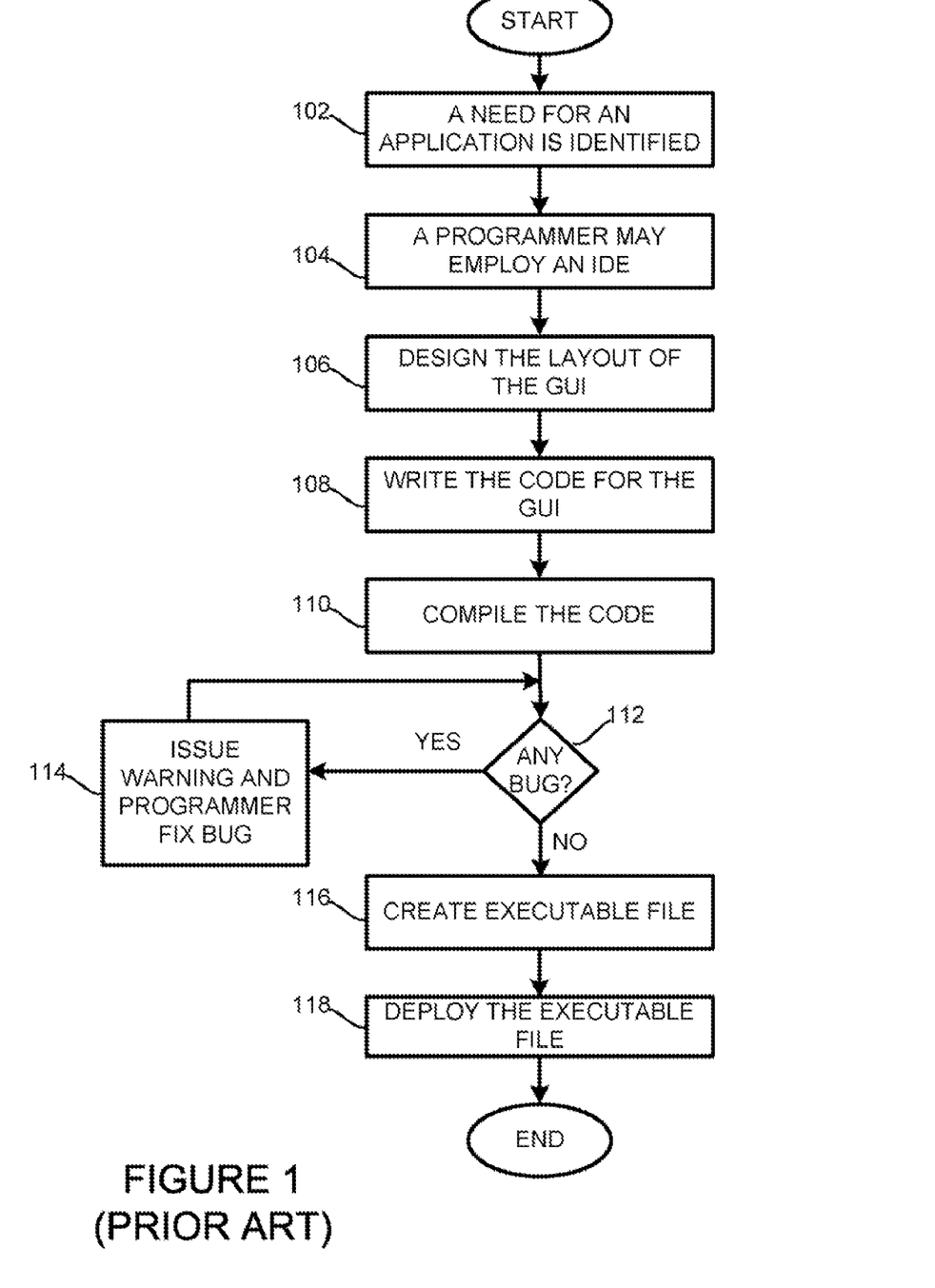
FIG. 1 shows a simple development cycle for customized software applications.

To facilitate discussion, FIG. 1 shows a simple development cycle for developing customized software application in a plasma processing environment. At a first step 102, a need for a customized software application may be identified. Consider the situation wherein, for example, testers may need a software application for creating test plans. At a next step 104, a programmer may employ an IDE (e.g., Microsoft® Visual Studio, Borland® Delphi, and National Instrument™ LabVIEW) to begin the process of creating the software application.

At a next step 106, the programmer may design the GUI for the software application. In an example, to create the GUI for a form, the programmer may add components (such as text box, list box, checkbox, etc.) to the IDE to create the layout for the form.

At a next step 108, the programmer may write the code for the software application. The code may include, but are not limited to, defining load specifications, defining sequence for functionality, defining logic criteria, identify tables, and code for handling data entry.

At a next step 110, the programmer may compile the code to identify potential bugs and to create an executable file.

At a next step 112, the method may determine whether or not the code includes bugs. Since the code is written by a programmer, the code may be susceptible to human errors (e.g., bugs). In an example, if the programmer is creating a form for collecting data, the programmer may have to know the name of the tables and the table fields that may store the data collected by the form. While writing the table information into the code, the programmer may misspell the table fields resulting in a potential bug in the code.

If the code contains bugs, then at a next step 114, the method may provide a warning. By receiving this warning, the programmer may have to debug the code and implement a fix before returning to a next step 110 to compile the code again. Steps 110 through steps 114 may be iterative until all bugs have been identified.

If no additional bugs are identified, then at a next step 116, an executable file may be created.

At a next step 118, the customized software application may be distributed to end-users. In an example, once the programmer has completed creating the software application for the testers, the customized software application may be deployed.

The IDE method of creating customized software application may require skill and knowledge that a non-programmer may not possess. Further, changes to the customized software application may require code changes and may require the code to be re-complied. In an example, a programmer may not have understood the requirement of the end-user, thus, creating a software application that may require changes to be made to the software application. To implement changes, new code may have to be written and the code may have to be re-complied.

BRIEF DESCRIPTION OF THE DRAWINGS

The present invention is illustrated by way of example, and not by way of limitation, in the figures of the accompanying drawings and in which like reference numerals refer to similar elements and in which.

SUMMARY

The invention relates, in an embodiment, to a method for generating plasma processing system component analysis software. The method includes defining component specifications for a plurality of components. Each of the plurality of components implements at least one of a user-interface function, a logic operation function, an input function, and an output function for analyzing a plasma processing system component. Defining includes selecting the plurality of components from a component panel of a visual integrated design editor architecture (VIDEA), thereby causing the plurality of components to be disposed in a layout format in the VIDEA. Defining also includes specifying properties of each of the plurality of components by performing at least one of selecting from predefined properties and defining parameters for the properties. The method also includes saving the plurality of components after the defining in a mark-up language configured to be executable by a browser without requiring prior compiling.

In another embodiment, the invention relates to an article of manufacture comprising a program storage medium having computer readable code embodied therein. The computer readable code is configured for generating plasma processing system component analysis software. The article of manufacture includes computer-readable code for facilitating defining component specifications by a user for a plurality of components. Each of the plurality of components implements at least one of a user-interface function, a logic operation function, an input function, and an output function for analyzing a plasma processing system component. The computer-readable code for facilitating defining component specifications includes computer-readable code for selecting the plurality of components from a component panel of a visual integrated design editor architecture (VIDEA), thereby causing the plurality of components to be disposed in a layout format in the VIDEA. The computer-readable code for facilitating defining component specifications also includes computer-readable code for specifying properties of each of the plurality of components by performing at least one of selecting from predefined properties and defining parameters for the properties. The article of manufacture also includes computer-readable code for saving the plurality of components after the defining in a mark-up language configured to be executable by a browser without requiring prior compiling.

In yet another embodiment, the invention relates to an arrangement for generating plasma processing system component analysis software. The arrangement includes a plurality of components. Each of the plurality of components implements at least one of a user-interface function, a logic operation function, an input function, and an output function for defining component specifications. The plurality of components is selectable from a component panel of a visual integrated design editor architecture (VIDEA), thereby causing the plurality of components to be disposed in a layout format in the VIDEA after being selected. The properties of each of the plurality of components are configurable by performing at least one of selecting from predefined properties and defining parameters for the properties. The arrangement also includes a run-time loader. The run-time loader is configured to execute the plurality of components, which is saved in a mark-up language configured to be executable by the run-time loader without requiring prior compiling.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventors herein realized that the process of creating, maintaining, and updating customized software applications may be simplified by providing a visual IDE environment. Unlike the prior art, the inventors realized that the codes may have to be incorporated into a plurality of components that may be configurable to add or remove functionality.

In accordance with embodiments of the present invention, a visual integrated design editor architecture (VIDEA) is provided in which components and component properties may be manipulated to create a plasma processing system component analysis software. Embodiments of the invention also provide for the layout design of the component and the values of the component properties to be saved in a markup language, such as an extensible markup language (XML) file. Embodiments of the invention further provide for the XML file to be implemented by a run-time loader. As discussed herein, a run-time loader refers to software that reads the file and executes the XML.

In an embodiment of the invention, a VIDEA environment is provided in which a customized software application (e.g., plasma processing system component analysis software) may be created, maintained, and updated. In an embodiment of the invention, a method is enabled for implementing a VIDEA. Consider the situation wherein, for example, a user wants to create a test plan software application. By employing the VIDEA, a user may create a plurality of layouts (e.g., test design layout, recipe design layout, etc.). In an example, the user may create the test design layout for the test plane software application. In an embodiment, the user may create the layout by adding (e.g., dragging and dropping components onto an editor) a plurality of components (such as text box, list box, checkbox, etc.) to the IDE to create the layout.

Unlike the prior art, the user does not have to program the code for defining the components. With the VIDEA, a user may create executable customized software application without programming knowledge. In an embodiment, the user may define the component specifications (e.g., functionalities). By configuring each components, functionalities may include, but are not limited to, defining the physical features of a component, defining load specifications, defining sequence for functionality, defining logic criteria, identify tables, and code for handling data entry. Since each configurable component may be associated with rules for defining the parameters, the task of debugging a program by a complier may be eliminated.

In yet another embodiment, the VIDEA may be able to configure the components by internalizing external data. In an example, the VIDEA may access a plurality of databases and provide a list of fields from which the user may be able to select from. In another example, the VIDEA may access data stored on a tool. By incorporating external data, the VIDEA may provide the user with a dynamic method for accessing external data while configuring the components. Thus, the VIDEA may eliminate the need for the user to search for external data.

Once the test design layout has been finalized, the user may save the software application as an XML file, in an embodiment. Unlike the prior art, the file created by the VIDEA does not require a complier to debug the program and/or create an executable file. In an embodiment of the invention, a VIDEA environment may also provide a run-time loader, which may be employed to execute the customized software application. The run-time loader may read the XML file to construct a GUI interface for an end-user to utilize. The run-time loader may be employed to load a plurality of different software applications (e.g., test design, report design, recipe design, configuration design, etc.). In an embodiment, the same layout data may be employed for different purpose. In an example, an XML file with a test design layout may be employed to generate a test plan. The same XML file may be employed to provide a report of the data collected by the test play.

The features and advantages of the invention may be better understood with reference to the figures and discussions that follow.

Figure 2:
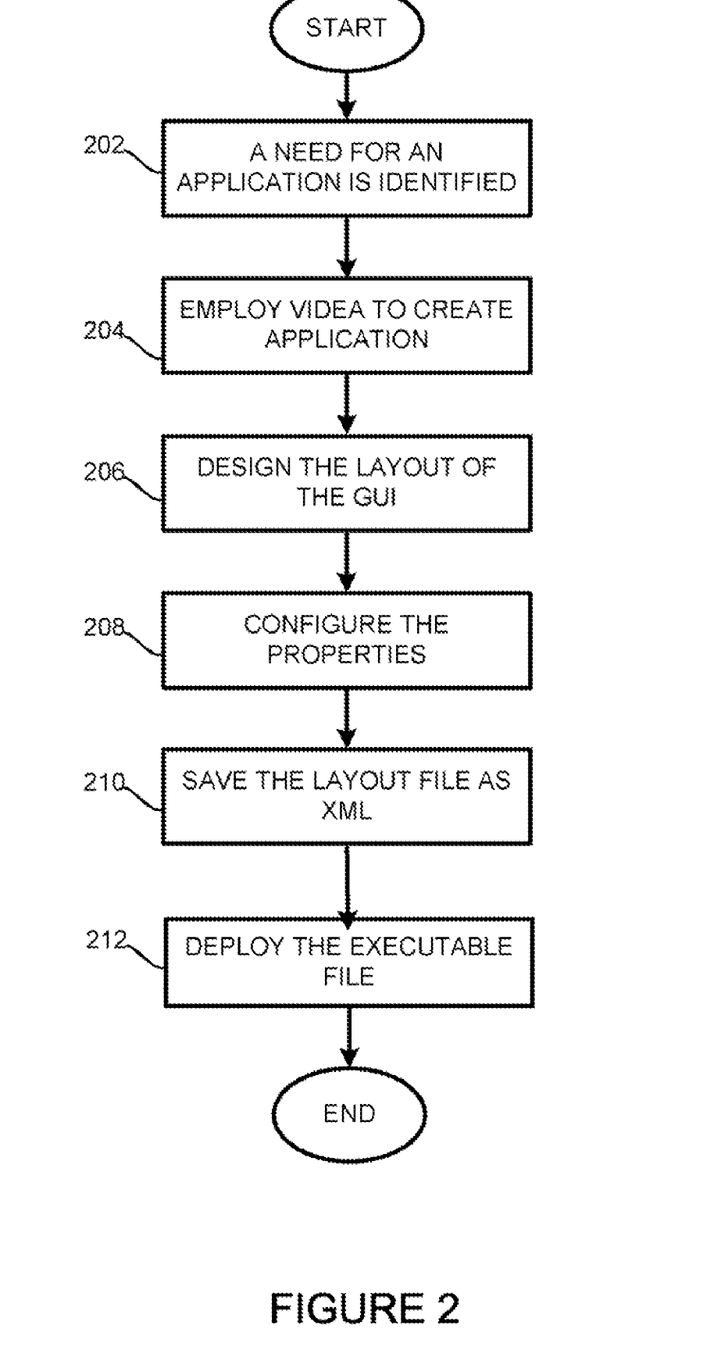
FIG. 2 shows, in an embodiment of the invention, a simple development cycle for a customized software application using a VIDEA.

FIG. 2 shows, in an embodiment of the invention, a simple development cycle for a customized software application using a VIDEA. FIGS. 3-7 will be discussed in tandem with FIG. 2 to illustrate how the steps in FIG. 2 may be applied. The example shown in FIGS. 3-7 is specific to an Automatic Test and Characterization (ATAC) framework.

At a first step 202, a need for a customized software application may be identified.

At a next step 204, a user may employ a VIDEA to begin the process of creating the software application. In an embodiment, the user may be a programmer or a non-programmer.

Figure 3:
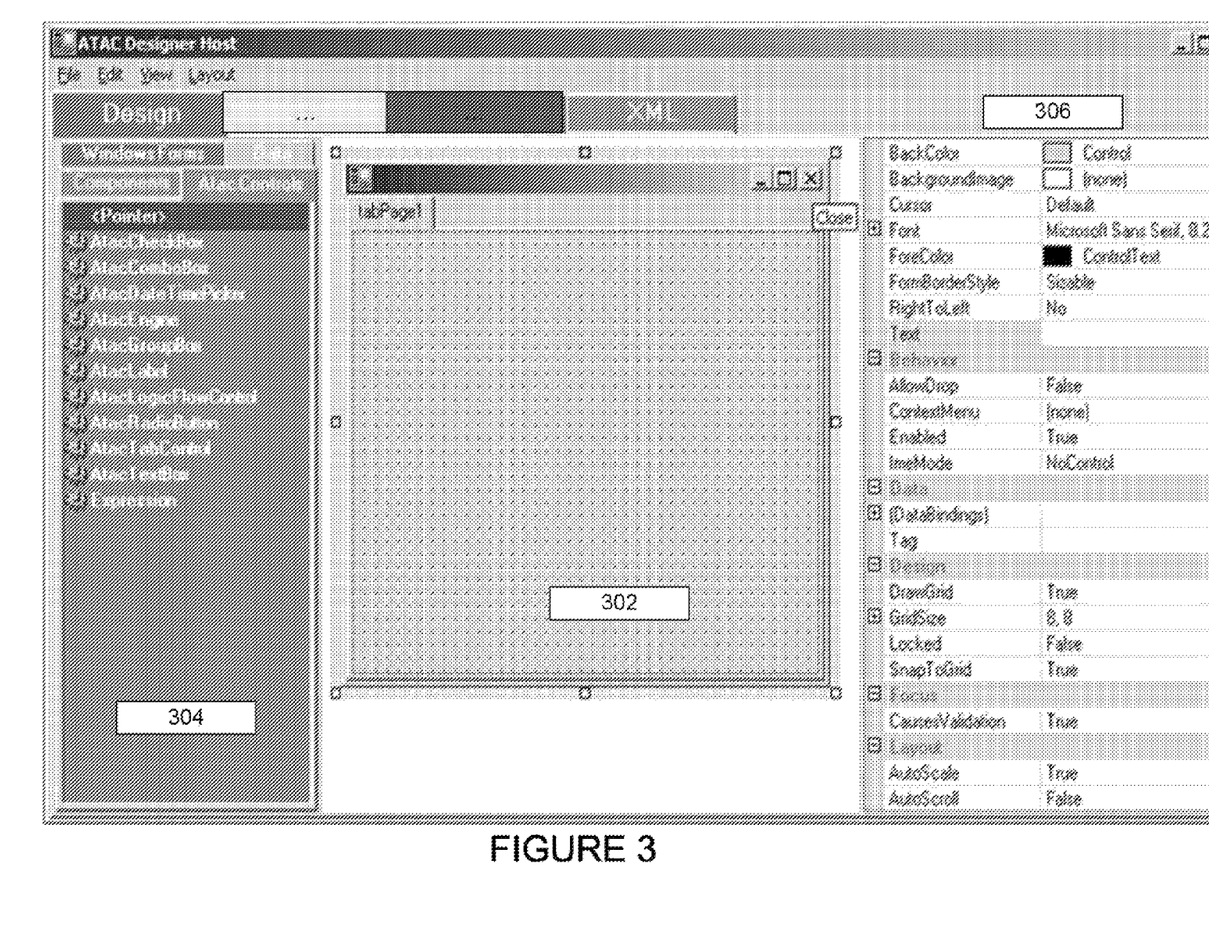
FIG. 3 shows, in an embodiment of the inventions, an example of a VIDEA user interface.

FIG. 3 shows, in an embodiment of the invention, an example of a VIDEA user interface. In an embodiment, the VIDEA may include an open-source designer host library such as the one offered by Microsoft®. The VIDEA may include an editor 302, a component box 304, and a properties box 306.

At a next step 206, the user may design the GUI for the software application. In an example, to create a GUI for a form, the programmer may add components (such as text box, list box, checkbox, etc.) to the IDE to create the layout for the form.

Figure 4:
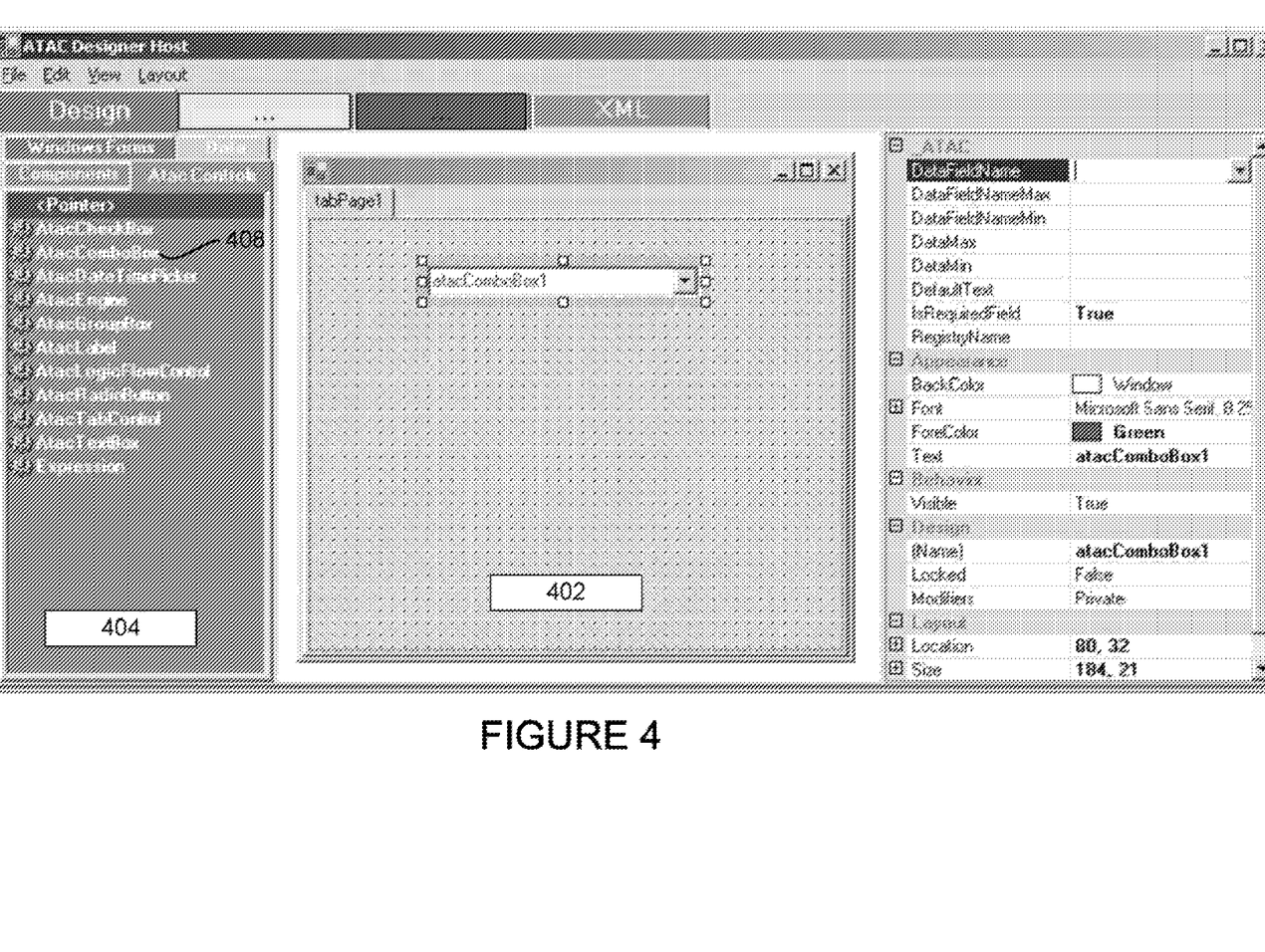
FIG. 4 shows, in an embodiment of the invention, an example of a VIDEA user interface with a component in an editor.

FIG. 4 shows, in an embodiment of the invention, an example of a VIDEA user interface with a component in an editor. In an example, the user may begin creating a customized software application by dragging component 408 (i.e., AtacComboBox) from a component box 404 to an editor 402.

Figure 5:
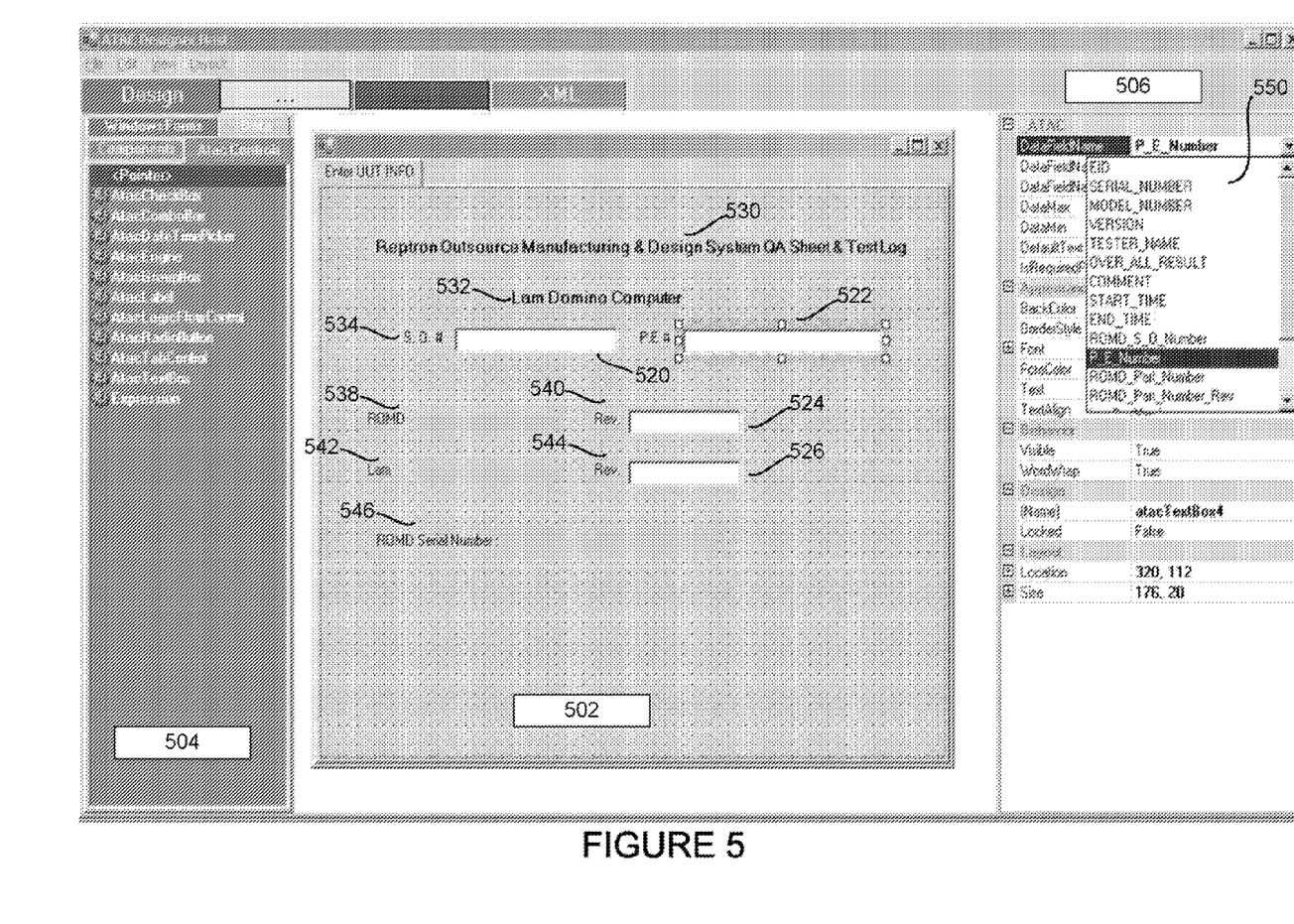
FIG. 5 shows, in an embodiment of the invention, an example of how components may be defined within a VIDEA environment.
Figure 6:
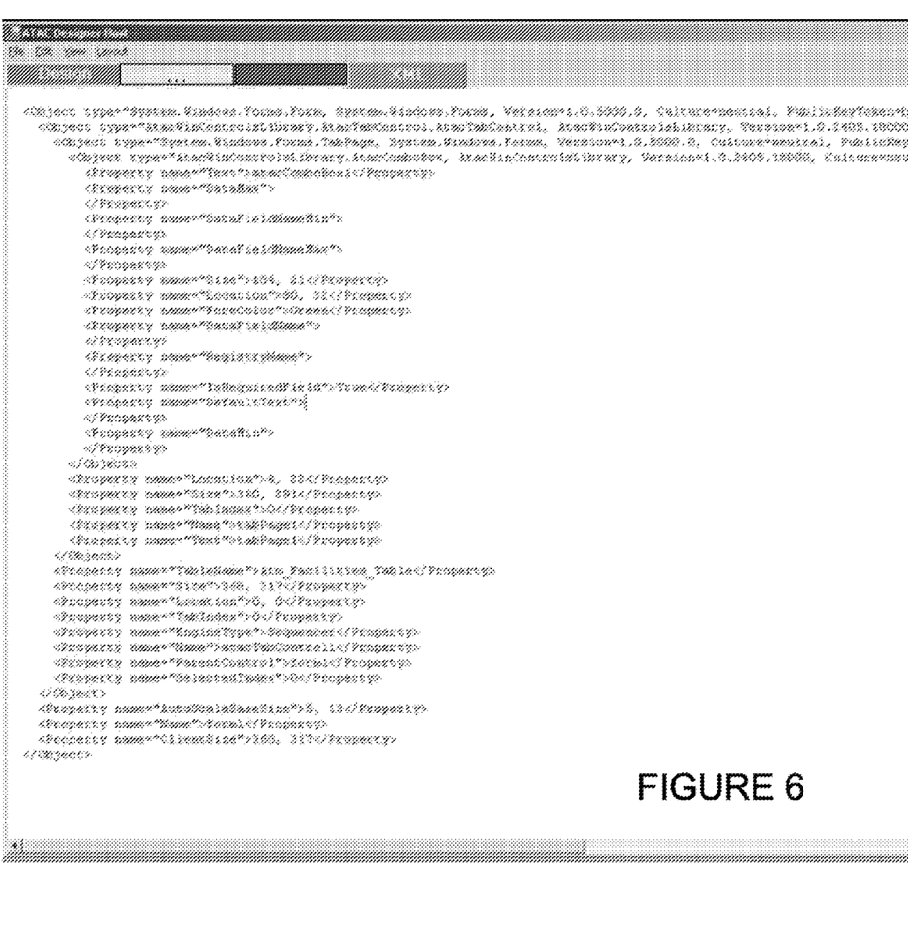
FIG. 6 shows, in an embodiment of the invention, an example of an XML file.

At a next step 208, the user may configure each component by manipulating and/or selecting the properties (e.g., parameters). FIG. 5 shows, in an embodiment of the invention, an example of how components may be defined within a VIDEA environment. An editor 502 may include a plurality of components dragged from a component box 504. In an example, text boxes (520, 522, 524, and 526) are examples of AtacTextBox from component box 504 and labels (530, 532, 534, 536, 538, 540, 542, 544, and 546) are examples of AtacLabel from component box 504. Once each component is placed on editor 502, each component may be moved around on editor 502 to create the desired layout for the GUI.

For each of the components of the desired layout, the functionality for each component may be defined. In an example, the user may configure the properties in a properties box 506 for each of the components. In an embodiment, the user may configure each component by selecting the properties from a predefined list (e.g., drop down list). Predefined list may be employed to minimize human errors (e.g., typographical errors) and frustration (e.g., being unable to remember the location of a table field). In another embodiment, the user may configure each component by manipulating the properties, such as by typing the parameters. The properties that may be configured may include, but are not limited to, a user-interface function, a logic operation function, an input function, and an output function In an embodiment, a user-interface function of a component may be configured Consider the situation wherein, for example, an ATAC test plan is being designed. The user may configure the different physical features of each of the components to create a design layout that is visually pleasing. Physical features that may be manipulated may include, but are not limited to, font size, font color, background color, text alignment, border color, and the like.

In an embodiment, the input/output function of a component may be configured. In an embodiment, the input/output function of a component may be associated with data from external sources. Data from external sources may be derived from databases and/or external devices (e.g., gas box, processing module, etc.) in an embodiment. In an example, the user may select from a list of tables and/or a list of table fields (as seen in data field list 550), thus, enabling the data input/output of a component to be associated with a table. In another example, the VIDEA may pull data about a plasma processing system allowing the user to define the condition of a chamber for processing. By connecting to the external environment, the VIDEA may dynamically pull data from the external sources to provide the user with information which may assist in configuring the properties of the components.

In an embodiment, the logic operation function of a component may be configured. In an example, a logic operation function that may be defined is the sequence (e.g., identifying the part being tested before pulling the test specification from the database) for performing an ATAC test plan. In another example, the criteria (e.g., if-else condition, do-while loop, etc.) for executing a section of the ATAC test plan may be defined. In yet another example, code for handling data (e.g., data collected, data entered manually, data pulled from external sources, etc.) may be defined.

At a next step 210, the layout design and component properties may be saved as an XML file. This method does not require a complier to debug the program and/or create an executable file. See FIG. 6 for an example of an XML file.

Figure 7:
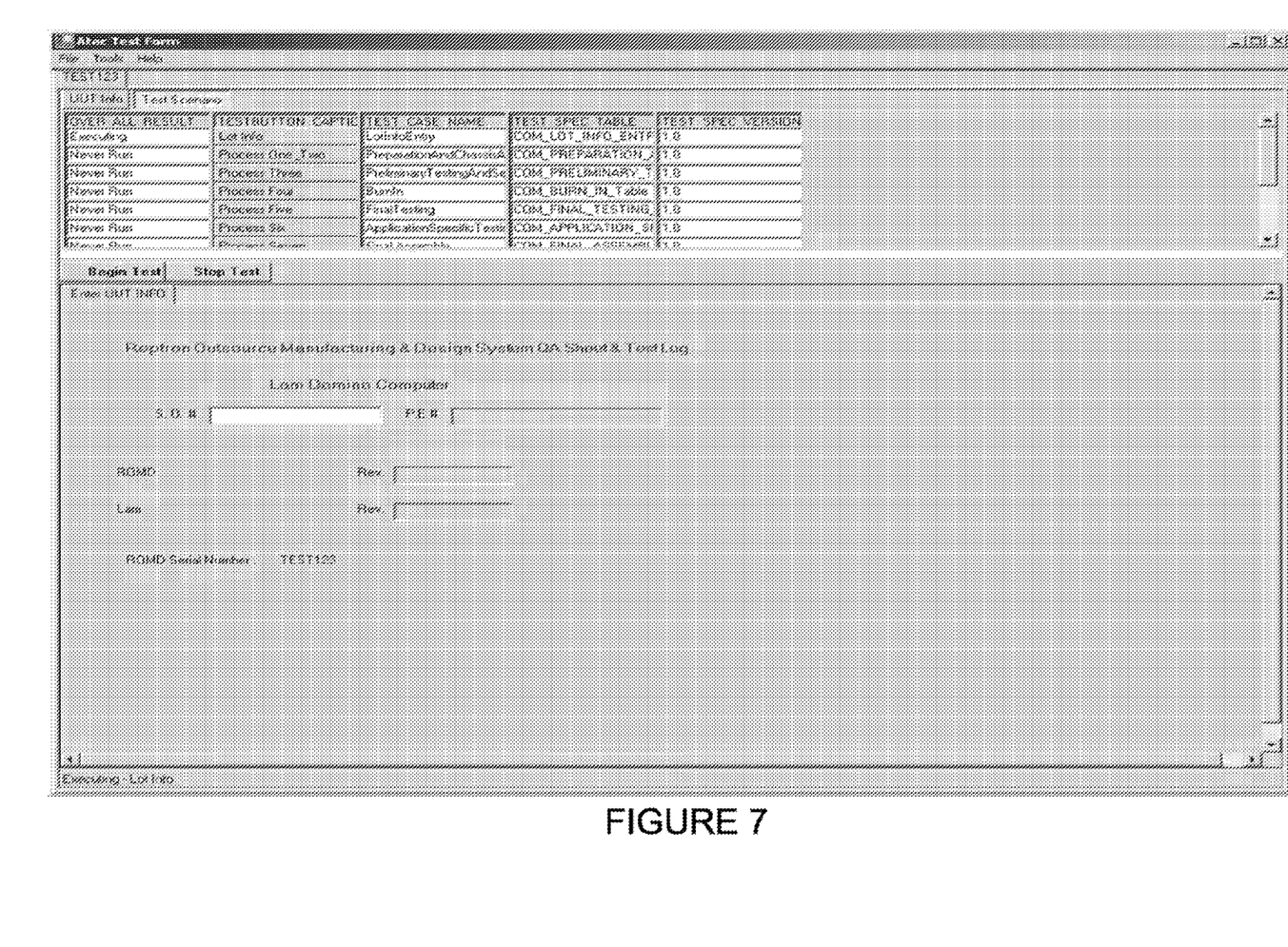
FIG. 7 shows, in an embodiment of the invention, an example of a customized software application during run-time.

At a next step 212, the customized software application may be distributed to end-users. FIG. 7 shows, in an embodiment of the invention, an example of a customized software application during run-time.

Since the VIDEA may require no programming knowledge and may require minimum training time, a user may easily employ VIDEA to create customized software application to meet everyday usage. In addition, changes and/or updates to a customized software application may be easily performed without requiring complicated programming changes and/or recompiling.

Figure 8:
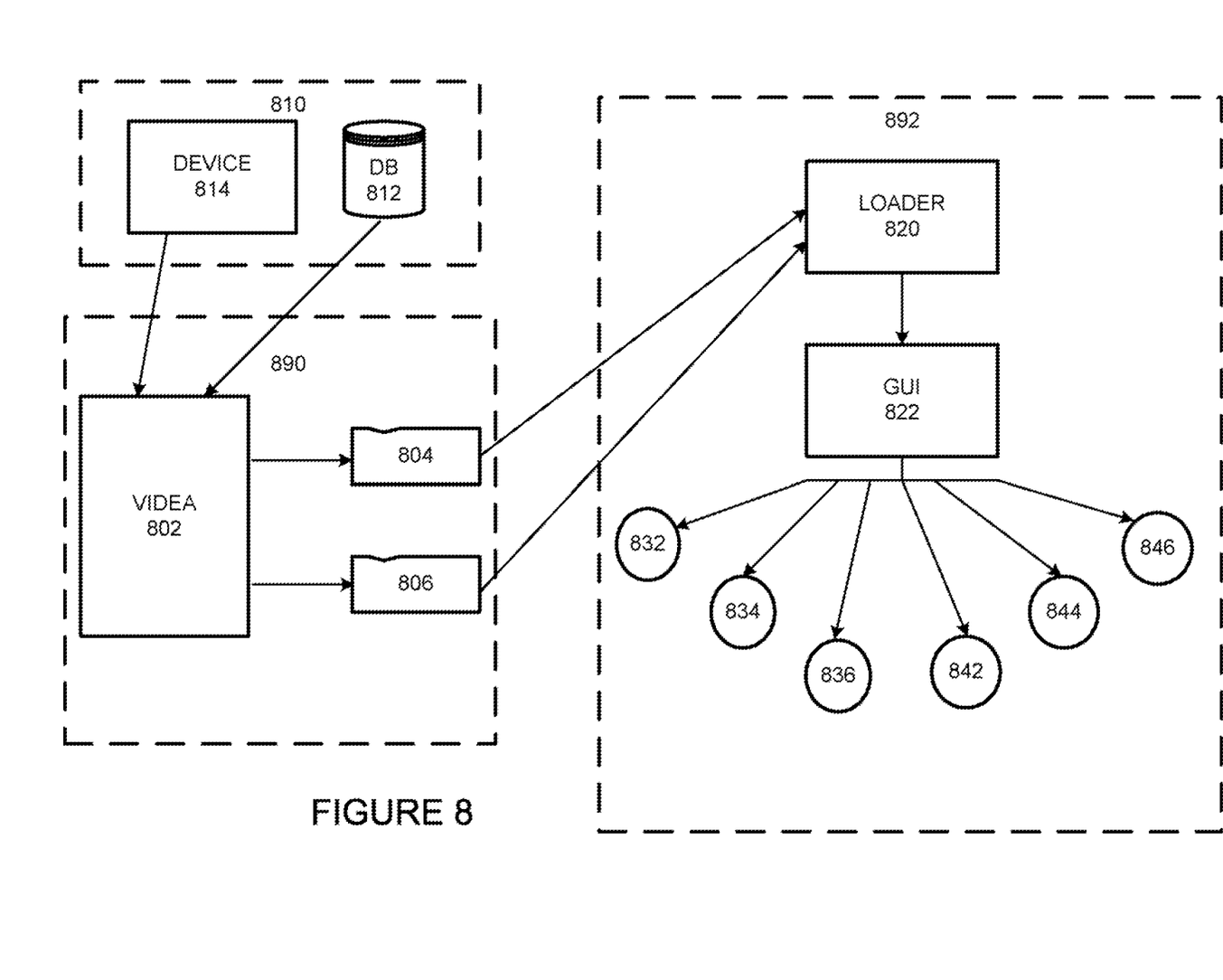
FIG. 8 shows, in an embodiment of the invention, a block diagram illustrating the overall VIDEA environment.

FIG. 8 shows, in an embodiment of the invention, a block diagram illustrating the overall VIDEA environment. The overall VIDEA environment may be divided into two sections—a VIDEA section 890 and a run-time loader section 892. VIDEA section 890 shows the block diagram related to creating, maintaining, and/or updating a customized software application. Run-time loader section 892 shows the block diagram related to running the customized software application.

VIDEA section 890 may include a VIDEA 802, which may be activated to create customized software applications. With VIDEA 802, a user may layout the design for a GUI by dragging and dropping components onto an editor. The user may also configure the properties for each of the components to define the functionality of each component. In an embodiment, the VIDEA may be connected to an external environment 810 to pull in database information 812 and/or data about external devices 814 (e.g., plasma processing tools, appliances, electronic devices, etc.). Once the layout of the GUI has been completed, the user may save the information to create an XML file. In an example, a test design layout may be saved as an XML file 804. In another example, a recipe design layout may be saved as an XML file 806.

Run-time loader section 892 may include a run-time loader 820, which may read an XML file (e.g., 804 and/or 806) to reconstruct a GUI interface 822 for an end-user to utilize. In an embodiment, the end-user may be the same person who created the customized user interface. Run-time loader 820 may be employed to load different applications (e.g., test design, report design, recipe design, configuration design, etc.). In other words, run-time loader 820 may be employed to load any type of customized software applications as long as the customized software applications are saved in an XML format.

In an embodiment, the same layout data may be employed for different purpose. In other words, once GUI interface 822 has been reconstructed, the end-user may be offered the opportunity to determine how GUI interface 822 may be employed. In an example, XML file 804 with a test design layout may be employed to generate a test plan 832 that may provide guidance to an end-user in testing a part and to collect and store test results. The same XML file 804 with a test design layout may be employed to provide a report 834 of the test plan and the data collected. In addition, the same XML file 804 with a test design layout may be employed to generate a PDF report 836 that may be saved and/or shared with other users. In another example, XML file 806 with a recipe design layout may be employed to generate a configuration file 842 which may be loaded onto a plasma processing tool to configure the tool for processing a substrate. Again, the same XML file 806 with a recipe design layout may be employed to provide a report 844 and/or a PDF report 846.

As can be appreciated from the embodiments of the invention, the VIDEA provides for a simple visual IDE that requires no programming skill and/or knowledge by a user. By simplifying the creation of a customized software application, the creation process may now be push-down to users that understand the application requirement. In addition, changes and/or updates to the customized software application may be easily implemented without requiring debugging and/or compiling to be performed. Thus, the VIDEA may eliminate high overhead costs and may reduce development time.

While this invention has been described in terms of several preferred embodiments, there are alternations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A computer-implemented method for generating plasma processing system component analysis software, comprising:

defining component specifications for a plurality of components, each of said plurality of components implementing at least one of a user-interface function, a logic operation function, an input function, and an output function for analyzing a plasma processing system component, said defining including:

selecting said plurality of components from a component panel of a visual integrated design editor architecture (VIDEA), thereby causing said plurality of components to be disposed in a layout format in said VIDEA, and specifying properties of each of said plurality of components by performing at least one of selecting from predefined properties and defining parameters for said properties, said predefined properties for said plurality of components is defined by an external source, wherein said external source is at least one of a database and an external device;

configuring at least one component of said plurality of components by defining physical feature; defining load specification; defining logic criteria; and identifying code handling data entry; and saving said plurality of components after said defining in a mark-up language configured to be executable by a run-time loader without requiring prior compiling, said run-time loader is provided by said VIDEA.

2. The method of claim 1 wherein said selecting of said plurality of components from said component panel including dragging and dropping said plurality of components onto an integrated design editor.

3. The method of claim 1 wherein said mark-up language is an extensible mark-up language.

4. An article of manufacture comprising a program storage medium having computer readable code embodied therein, said computer readable code being configured for generating plasma processing system component analysis software, comprising:

computer readable code for facilitating defining component specifications for a plurality of components, each of said plurality of components implementing at least one of a user-interface function, a logic operation function, an input function, and an output function for analyzing a plasma processing system component, said defining including:

computer readable code for selecting said plurality of components from a component panel of a visual integrated design editor architecture (VIDEA), thereby causing said plurality of components to be disposed in a layout format in said VIDEA, and computer readable code for specifying properties of each of said plurality of components by performing at least one of selecting from predefined properties and defining parameters for said properties, said predefined properties for said plurality of components is defined by an external source, wherein said external source is at least one of a database and an external device;

computer readable code for configuring at least one component of said plurality of components by defining physical feature; defining load specification; defining logic criteria; and identifying code handling data entry; and computer readable code for saving said plurality of components after said defining in a mark-up language configured to be executable by a run-time loader without requiring prior compiling, said run-time loader is provided by said VIDEA.

5. The article of manufacture of claim 4 wherein said computer-readable code for selecting of said plurality of components from said component panel including computer-readable code for dragging and dropping said plurality of components onto an integrated design editor.

6. The article of manufacture of claim 4 wherein said mark-up language is an extensible mark-up language.

7. A computing device for generating plasma processing system component analysis software, comprising:

a plurality of components, each of said plurality of components implementing at least one of a user-interface function, a logic operation function, an input function, and an output function for defining component specifications, wherein said plurality of components is selectable from a component panel of a visual integrated design editor architecture (VIDEA), thereby causing said plurality of components to be disposed in a layout format in said VIDEA after being selected, and wherein properties of each of said plurality of components are configurable by performing at least one of selecting from predefined properties and defining parameters for said properties, said predefined properties for said plurality of components is defined by an external source, wherein said external source is at least one of a database and an external device;

configuring at least one component of said plurality of components by defining physical feature; defining load specification; defining logic criteria; and identifying code handling data entry;

a run-time loader, said run-time loader being configured to execute said plurality of components, said plurality of components being saved in a mark-up language configured to be executable by said run-time loader without requiring prior compiling, said run-time loader is provided by said VIDEA, and circuits for performing tasks pertaining to said plurality of components.

8. The computing device of claim 7 wherein said plurality of components is selectable from said component panel by dragging and dropping said plurality of components onto an integrated design editor.

9. The computing device of claim 7 wherein said mark-up language is an extensible mark-up language.

* * * * *